United States Patent [19]

Fano et al.

[11] 4,003,595
[45] Jan. 18, 1977

[54] SANITARY WASTE RECEIVER

[76] Inventors: Joseph D. Fano, 85-17 150th St., Jamaica, N.Y. 11435; Fu Hwa, 82-78 167th St., Jamaica, N.Y. 11432

[22] Filed: Nov. 10, 1975

[21] Appl. No.: 630,171

[52] U.S. Cl. .............................. 294/19 R; 294/1 R
[51] Int. Cl.[2] ...................................... A01K 29/00
[58] Field of Search .................. 294/1 R, 19 R, 55; 15/257.1, 257.4, 257.6, 257.7, 257.9; 56/332, 337, 339; 119/1, 153; 150/3, 11, 43; 248/95, 99

[56] References Cited

UNITED STATES PATENTS

| 1,463,776 | 7/1923 | Knudtson | 119/153 |
| 1,478,999 | 1/1924 | Johnson | 119/153 |
| 3,744,453 | 7/1973 | Deitch | 294/19 R X |
| 3,777,708 | 12/1973 | Vogt | 294/19 R X |
| 3,819,220 | 6/1974 | Bredt | 294/19 R |

FOREIGN PATENTS OR APPLICATIONS 1,275,326   8/1968   Germany .......................... 119/153

*Primary Examiner*—Johnny D. Cherry
*Attorney, Agent, or Firm*—Allison C. Collard; V. Alexander Scher

[57] ABSTRACT

A sanitary waste receiver is used for receiving and collecting waste products and droppings of dogs and similar animals. The waste receiver includes a disposable container having a draw band and combined with a spring loaded rod assembly and capable of being locked in a closed position until ready for disposal. In the open position the container can be conveniently used to capture animal feces. The rod assembly includes a sliding handle with a lock slide and a hook for the draw band of the container.

6 Claims, 3 Drawing Figures

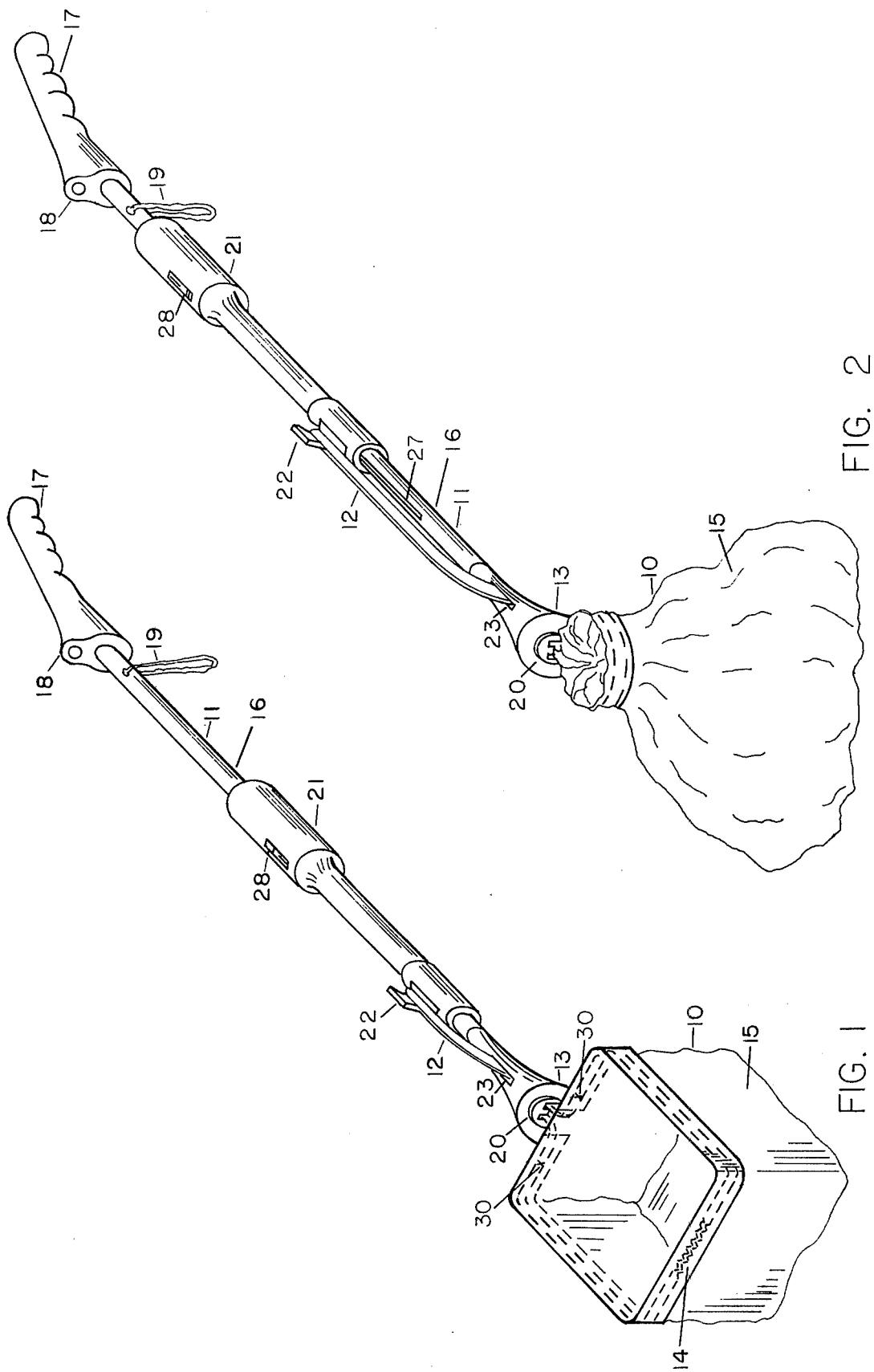

SANITARY WASTE RECEIVER

This invention relates to a sanitary waste receiver and refers more particularly to a portable sanitation device for collecting the fecal matter or stool of animals, such as dogs.

An object of the present invention is to provide a device which can be used to retrieve dog stool in a simple and effective way and which is comparatively inexpensive to manufacture.

Another object is the provision of a device of described type wherein animal feces is disposed in a closed locked container, so that it can be submitted into a municipal or private refuse collection system for disposal, thereby avoiding the danger of pollutants entering drainage systems.

Other objects will become apparent in the course of the following specification.

In the accomplishment of the objectives of the present invention it was found desirable to provide a container having an outer edge carrying a draw band, with a locking plate, which extends through an inlet tip and is looped around a draw band hook carried by a sliding handle. A rod has a spring loaded rod assembly which includes the sliding handle carrying the hook and is also provided with sliding handle lock. When the container is filled the user can quickly close and lock it by operating the rod assembly and without touching the container. Then the closed and locked container can be quickly and easily disposed and replaced by a new open container.

The invention will appear more clearly from the following detailed description when taken in connection with the accompanying drawings showing by way of example only, a preferred embodiment of the inventive idea.

In the drawings:

FIG. 1 is a perspective view of the waste receiver with the container in its open position.

FIG. 2 is similar to FIG. 1 but shows the container in its closed position.

Figure 3:
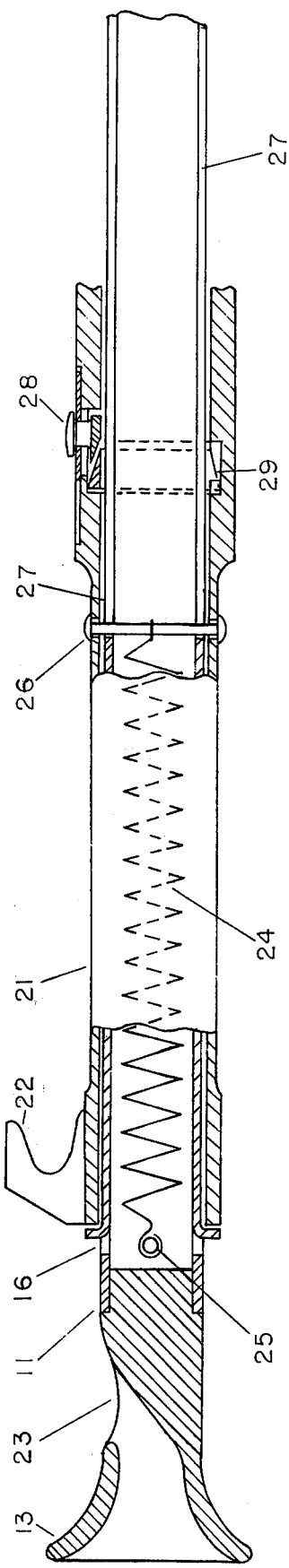
FIG. 3 is a section through the rod assembly on an enlarged scale.

The illustrated waste receiver has a container 10 and a rod assembly 11. The container 10 has an upper edge shaped by a draw band 12. The flexible draw band may consist of molded plastic, composition or spring wire. It must be sufficiently strong to maintain its bent shape and yet it must easily give up this shape when pulled. The ends of the draw band are joined. FIG. 1 shows the draw band extending out of the inlet tip 13 of the rod assembly and having a rectangular shape in cross-section.

Obviously the rectangular shape may be changed into round, oval, square or diamond shapes. The inlet tip 13 also may have various shapes.

The front portion of the draw band 12 has serrated top and bottom edges 14 with rounded tips. The rear portion of the draw band 12 has a locking plate 20 with two parallel slots through which the draw band 12 is inserted.

The rectangular portion of the draw band carries a container bag 15. The bag 15 consists of any suitable flexible nontransparent water resistant material, such as plastic. The outer edge of the bag is folded over and sealed to the outside of the bag. Thus a loop is formed through which the draw band 12 extends.

Close to the inlet tip 13 the folded edge of the bag 15 is opened to enable the draw band 12 to extend from both sides into the inlet tip.

On either side of this opening the looped flap of the bag can be attached at 30 to the draw band by welding, gluing or any other mechanical means to prevent premature closure of the container.

The rod assembly 11 includes an elongated hollow rod 16 one end of which carries the inlet tip 13, while the opposite end carries a handle 17 of any suitable shape, a battery operated light 18 and a wrist loop 19. The inlet tip 13 has an opening 23 through which the ends of the draw band 12 extend angularly upward and toward the hook 22 for mounting.

A slide handle 21 is movably mounted upon a portion of the rod 16. The slide handle includes an outwardly extending hook 22.

Inside the rod 16 a light return spring 24 is provided. One end of the spring 24 is attached to a spring pin 25 which is attached to the rod 16. The opposite end of the spring 24 is attached to a spring pin 26 which is attached to the slide handle 21. The rod 16 has elongated slots 27 which make it possible for the slide handle 21 to move along with the pin 26 upon the rod 16.

It is apparent that the spring 24 may be arranged to operate on compression or tension.

The rod assembly also carries a sliding handle lock consisting of a slide 28 having an attached tapered wedge between the slide handle 21 and the outside of the rod 16. There is a split tapered ring 29 between the inside of the spring loaded slide handle 21 and the outside of the rod 16. The handle and the ring can travel in unison without rotating the compression ring out of position.

It is apparent that all the above-described parts can be made of plastic, composition, metal or wood and can be fabricated by forming, molding, casting, extruding or punching with matching shapes.

In operation it is advisable to place a deodorant inside the bag 15. As the animal assumes the position for solid elimination the open bag 15 is positioned directly below the animal's anus and the droppings will fall into the container. Upon completion the bag 15 will be closed and locked to assume the position shown in FIG. 2. This is achieved by sliding the handle 21 upon the rod 16 in the direction toward the handle 17. During this movement the draw band 12 is pulled by the hook 22 through the parallel slotted locking plate 20, which is held in place by inlet tip 13, so that the serrated edges 14 engage with locking plate 20 and finally assume the tightly locked round compressed shape shown in FIG. 2. The handle 21 is locked by pushing the slide 28 into its forward clamping position.

The closed locked bag can be transported in this position to a depository. To unload the bag, the assembly is turned so that the draw band hook 22 is in a downward position over a depository. Then the slide handle 21 is released, so that it will move by the spring 24 into its loading position. During the forward movement of the slide handle 21 the draw band 12 is disengaged from the hook 22 and the bag will drop into the depository by gravity.

A new bag can be easily inserted in the manner indicated in FIG. 1.

It is apparent that numerous variations can be made in the described device within the scope of the appended claims.

What is claimed is:

1. A portable sanitation device comprising a foldable container having upper edges, a hollow rod, a serrated draw band engaging the edges of said container, a draw band locking plate and means carried by said rod and connected with said draw band, said means being movable upon said rod and moving said draw band from a position in which it maintains the edges of said container open to a position in which it closes and locks said edges.

2. A device in accordance with claim 1, wherein said container has folded upper edges, said serrated draw band having a portion extending through the folds of said edges, the folds of said container being attached to said serrated draw band to prevent premature closure.

3. A portable sanitation device comprising a foldable container having folded upper edges, a hollow rod having an inlet, a serrated draw band engaging the edges of said container and having a portion extending through the folds of said edges and attached to said folds to prevent premature closure of the container, and means carried by said rod and movable upon said rod, said means comprising a hook, said draw band having another integral portion extending through said inlet and over said hook, whereby said means are movable from a position in which it maintains the edges of said container open to a position in which it closes and locks said edges.

4. A device in accordance with claim 3, wherein said movable means comprise a slide handle carrying said hook, said device further comprising a spring located within said rod and having one end connected with said rod and another end connected with said slide handle.

5. A device in accordance with claim 4, comprising a slide lock connected with said slide handle and having a wedge extending between the handle and the rod, a split tapered compression ring and means in said handle to prevent rotation of said split tapered compression ring.

6. A device in accordance with claim 4, having a battery operated light in said handle.

* * * * *